(12) United States Patent
Bang et al.

(10) Patent No.: US 7,782,421 B2
(45) Date of Patent: Aug. 24, 2010

(54) LIQUID CRYSTAL DISPLAY DEVICE

(75) Inventors: Ju-Young Bang, Seoul (KR); In-Jae Chung, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 142 days.

(21) Appl. No.: 12/155,323

(22) Filed: Jun. 2, 2008

(65) Prior Publication Data
US 2009/0015755 A1    Jan. 15, 2009

(30) Foreign Application Priority Data
Jun. 1, 2007    (KR) ...................... 10-2007-0054056

(51) Int. Cl.
*G02F 1/1335* (2006.01)
*F21V 7/04* (2006.01)

(52) U.S. Cl. ........................... 349/65; 349/62; 362/612; 362/613; 362/620

(58) Field of Classification Search .................. 349/62, 349/65; 362/611, 612, 613, 620
See application file for complete search history.

(56) References Cited

U.S. PATENT DOCUMENTS 7,193,248 B2 * 3/2007 Weindorf et al. ............ 257/100
7,210,839 B2 * 5/2007 Jung et al .................... 362/612
2002/0172030 A1 * 11/2002 Matsumoto et al. .......... 362/31
2005/0052590 A1 * 3/2005 Ochiai et al. ................. 349/71
2008/0024696 A1 * 1/2008 Arai et al. .................... 349/62

FOREIGN PATENT DOCUMENTS

WO    WO 2006040937 A1 *    4/2006

* cited by examiner

*Primary Examiner*—Hemang Sanghavi
(74) *Attorney, Agent, or Firm*—McKenna Long & Aldridge LLP

(57) ABSTRACT

A side type light emitting diode (LED) liquid crystal display (LCD) includes a prism light guide panel in a side type LED backlight to allow scanning and divisional driving to improve motion blur of video or an overall sharpness of an image. The side type LED LCD includes: a lower cover; first and second prism light guide panels disposed in a plurality of layers on the lower cover, ridges of prism mountains formed on the first prism light guide panel being substantially perpendicular to ridges of prism mountains formed on the second prism light guide panel; lamp units being provided on at least one side of each prism light guide panel along the ridges of the prism mountains; and a liquid crystal panel separated from the prism light guide panels that receives light transmitted through the first and second light guide panels emitted from the light units.

10 Claims, 12 Drawing Sheets

LIQUID CRYSTAL DISPLAY DEVICE

This application claims the benefit of Korean Patent Application No. 10-2007-0054056 filed on Jun. 1, 2007, which is hereby incorporated by reference for all purposes as if fully set forth herein.

BACKGROUND OF THE INVENTION

1. Field of the Invention

The present invention relates to a liquid crystal display (LCD) and, more particularly, to a side type LED LCD device capable of improving motion blur of video and sharpness of an image using a prism light guide panel.

2. Description of the Related Art

The importance of the display industry has increased along with the rapid development of the information communication sector. While CRTs (Cathode Ray Tubes) have long been employed to display images, the display industry has extended its reach into application fields including aircrafts and spacecrafts. Accordingly the demand for large, portable displays with high resolution has increased.

For example, currently manufactured or developed flat panel displays include the LCD (liquid crystal display), the ELD (Electro Luminescent Display), the FED (Field Emission Display), and the PDP (Plasma Display Panel). An ideal flat panel display would be light in weight, and would have high luminance, high efficiency, with high resolution and fast response time characteristics. The ideal flat panel display would also implement low-voltage driving, have low power consumption, be low in low cost, and display natural colors. Among the flat panel displays, the LCD has received much attention because of its advantages of durability and portability.

Because the LCD is not a self-emissive device, LCDs require a backlight unit providing a light source to illuminate the liquid crystal panel that displays an image according to information received from an external system. The CCFL (Cold Cathode Fluorescent lamp) and an LED (Light Emitting Diode) are among the typically used light sources.

Backlight units are characterized as side type backlight units or direct type backlight units depending on the disposition of the light source. Here, the side type backlight unit, in which the light source is disposed at the side portion of a light guide panel, is commonly employed for a small or medium model such as monitors of notebook computers or desktop computers, and the direct type backlight unit is commonly employed for the medium model such as the monitors of desktop computers or a large model such as TVs.

Side type backlight units are further divided into edge type backlight units in which at least one fluorescent lamp serving as a light source is positioned only at one side and plate type backlight units in which at least one fluorescent lamp is provided at both sides thereof. The edge type backlight unit is employed for the monitors of the notebook computers and the plate type backlight unit is employed for the monitors of the general desktop computers.

FIG. 1 an exploded perspective view of the general side type LED LCD in which the LED, a light source, is disposed at the side of the light guide panel.

As shown in FIG. 1, a reflective plate 21 that reflects light emitted from a light emitting unit, for example, a light emitting element such as the LED, to a liquid crystal panel 40 is attached on a lower cover 10, and metal PCBs 20 on which LEDs are fixedly arranged at uniform intervals and a light guide panel 24 are provided on the reflective plate 21.

The metal PCBs 20 are attached on an inner side of a surface curved upwardly from both edges of the lower cover 10, and in order to apply voltages to the LEDs fixed on the PCBs 20, the voltages supplied from a system external to the LCD are applied via holes formed at both corner portions of a bottom surface of the lower cover 10 to portions of positive (+) and negative (−) electrodes formed on the metal PCBs 20.

When the metal PCB 20 with the LEDs are attached to the side portions of the lower cover 10, light emitting units of the LEDs point toward the light guide panel 24, so light emitted therefrom is naturally introduced to the light guide panel 24.

Optical sheets 26 and 28 are stacked on the metal PCB 20 and the light guide panel 24 provided on the lower cover 10. The optical sheets 26 and 28 refer to two diffusion sheets 26 that diffuse light provided from the reflective plate 21 and the light guide panel 24 so as for the light to be irradiated to the liquid crystal panel 40, and two protection sheets 28 that protect the diffusion sheets 26.

A panel guide 30, a frame mold product, is positioned at an outer edge of the lower cover 10 in order to maintain the balance of overall power of the LCD and separate the liquid crystal panel by a certain interval.

The liquid crystal panel 40 for displaying an image is provided on the panel guide 30. The liquid crystal panel 40 includes a thin film transistor (TFT) array substrate and a color filter substrate that are attached in a facing manner with a uniform cell gap maintained therebetween, and liquid crystal injected between the two substrates.

An upper cover 50 in a rectangular frame shape that covers the edges of the liquid crystal panel 40 is assembled and fastened to the panel guide 30.

In the LCD having the side type LED backlight having such a structure as described above, a motion blur phenomenon occurs wherein motion is blurred when displaying video. Thus a scan driving method has been proposed.

FIG. 2 shows a simulation of the light propagation state when the LCD is scan-driven.

It is noted that when the LEDs constituting the backlight of the LCD are divided into a plurality of groups and scan-driven, light propagates (or diffuses) to the periphery of the light guide panel at the time of scanning driving in a particular region.

This phenomenon reveals that the LCD having a backlight of the related art has not been sufficiently improved by scan driving to improve the motion blur in displaying video. The related art backlight fails to meet the demands of consumers and the requirements of buyers.

An LCD having the side type LED backlight with a divisional light guide panel has been proposed as a solution, in which a backlight is scan-driven and has a structure to address the motion blurring problem.

FIG. 3 is an exploded perspective view showing the backlight structure of the side type LED LCD having a divisional light guide panel according to the related art.

As shown in FIG. 3, the backlight structure of the side type LED LCD with the divisional light guide panel includes a plurality of light guide panels 91a to 91d divided into four regions to perform field sequential (FS) driving, a lower reflective plate 92 provided at a lower side of the light guide panels 91a to 91d, and PCBs 94 fixed at both sides of the light guide panels 91a to 91d, on which a plurality of LEDs 93 are disposed.

The LEDs 93 provided on the PCBs 94 are divided into a light emitting part 93a and a body part 93b, respectively.

A plurality of dot patterns (not shown) are printed on a lower surface of the plurality of light guide panels 91a to 91d.

With the backlight unit having such configuration, the first to fourth light guide panels 91a to 91d are sequentially driven, and light made incident on each light guide panel from the LEDs 93 is totally reflected therein by the index of refraction of air, so that light propagation to an ambient light guide panel other than one corresponding to the driving region can be suppressed.

However, assembly of the plurality of light guide panels of the backlight unit with the above described configuration is cumbersome and requires a relatively large assembly time.

FIG. 4 is an exploded perspective view showing a direct type LED LCD of the related art.

As shown in FIG. 4, a direct type LED backlight unit is provided on a lower cover 130 to provide light to the liquid crystal panel 110. A first reflective plate (not shown) that covers the entire surface of the lower cover 130 is first attached on the lower cover 130.

A plurality of metal PCBs 132 are arranged at uniform intervals on the lower cover 130 with the first reflective plate attached thereon.

The metal PCBs 132 are sorts of metal bars. R (red), G (green), and B (blue) LEDs 134a, 134b and 134c as a string and a conductive pattern for driving the R, G, and B LEDs 134a, 134b and 134c are formed on a front surface of the metal PCBs 132. A metal material for improving a problem of generation of heat of high temperature related to the R, G and B LEDs 134a, 134b and 134c is formed on a rear surface of the metal PCBs 132.

A second reflective plate (not shown) is attached on the respective PCBs 132.

At an upper side of the metal PCBs 132, there are formed a diffusion plate 141 and a diffusion sheet 142 that diffuse light emitted from the R, G and B LEDs 134a, 134b and 134c, a prism sheet 144 that increases luminance of light which has transmitted through the diffusion plate 141 and the diffusion sheet 142, and a protection sheet 146 that protects the prism sheet 144.

A main support 150 is provided at an upper side of the backlight. The main support 150 is a mold product made of a synthetic resin or stainless steel in a rectangular frame shape and maintains an overall power balance of the LCD.

The liquid crystal panel 110 is stacked on the main support 150 to receive light from the lower backlight to display data information from the external. The liquid crystal panel 110 includes a TFT array substrate on which a TFT, a switching element, is installed at each unit pixel, a color filter substrate including color filters for expressing color, and liquid crystal injected between the two substrates.

The upper cover 160 covers the edges of four sides of the liquid crystal panel 110 and assembled and fastened to the main support 150 and the lower cover 130.

The direct type LED LCD illustrated in FIG. 4 can be driven in a scanning manner and also can be driven in a divisional manner such that backlight driving of a brighter portion and a darker portion can be partially controlled according to an image of the LCD, whereby the contrast ratio can be increased on the entire screen to thus improve sharpness of picture quality.

However, because, the direct type LED LCD includes a large number of LEDs on the lower cover to obtain uniform luminance, the display has relatively large amounts of power.

SUMMARY OF THE INVENTION

Accordingly, the present invention is directed to a liquid crystal display that substantially obviates one or more of the problems due to limitations and disadvantages of the related art An advantage of the present invention is to provide a liquid crystal display (LCD) employing a prism light guide panel to allow scanning and divisional driving in a side type LED backlight unit to thus reduce or remove motion blur of video or an overall sharpness of a screen image.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, there is provided an LCD including: a lower cover; first and second prism light guide panels disposed in a plurality of layers on the lower cover, ridges of prism mountains formed on the first prism light guide panel being substantially perpendicular to ridges of prism mountains formed on the second prism light guide panel; lamp units being provided on at least one side of each prism light guide panel along the ridges of the prism mountains; and a liquid crystal panel separated from the prism light guide panels that receives light transmitted through the first and second light guide panels emitted from the light units.

In another aspect of the present invention achieve the above object, there is also provided an LCD including: a lower cover; lamps provided to form a plurality of layers at edges of the lower cover and turned on by groups to provide light; a prism light guide panel that fastens the lamps to at least one side thereof, includes prism mountains extendedly formed in the same direction as a direction in which the light proceeds, is divided into a plurality of driving regions corresponding to the lamps driven by groups, and allows lights made incident to a corresponding driving region to overlap with each other to have an increase brightness when the lamps of each group are driven; and a liquid crystal panel separated from the prism light guide panel and provided with light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompanying drawings.

A side type light emitting diode (LED) liquid crystal display (LCD) according to an exemplary embodiment of the present invention will now be described with reference to FIG. 5.

Figure 5:
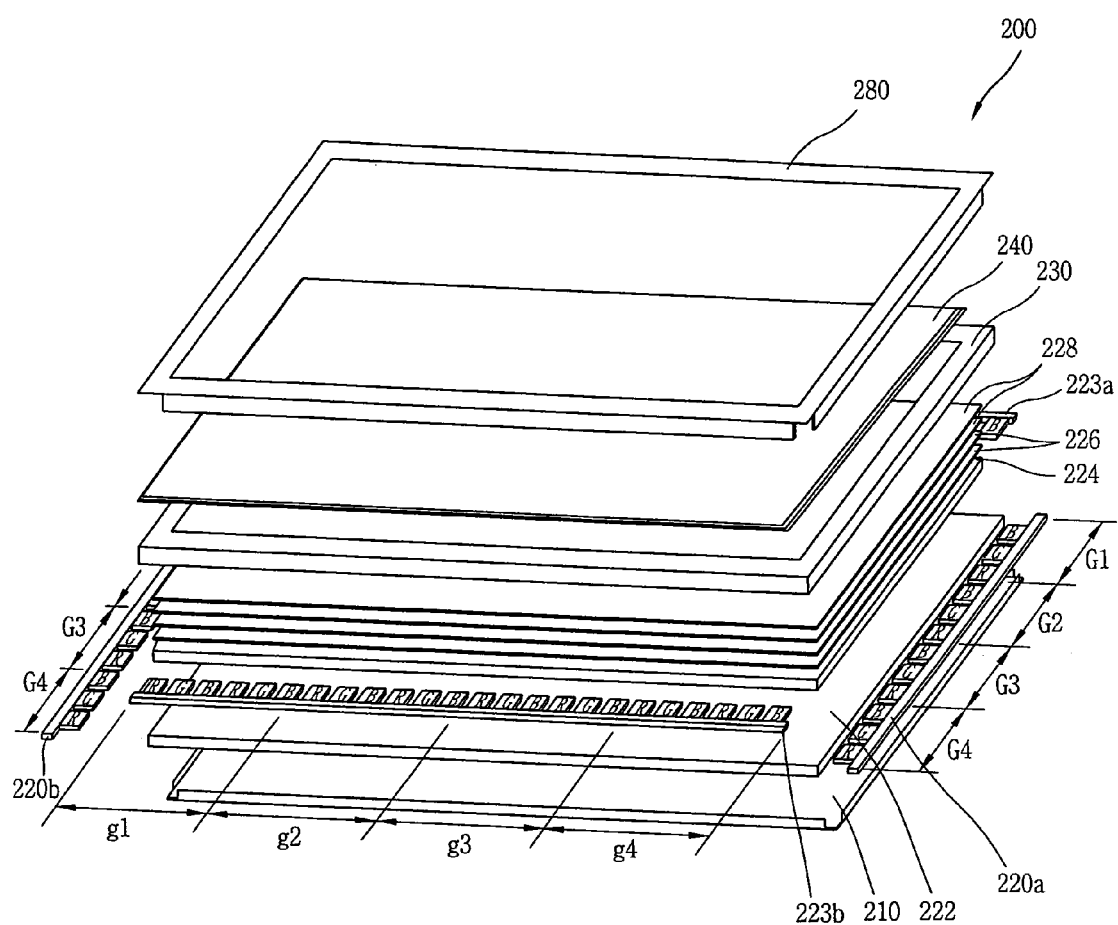
FIG. 5 is an exploded perspective view of a side type LED LCD according to an embodiment of the present invention.

FIG. 5 is an exploded perspective view of a side type LED LCD according to an exemplary embodiment of the present invention.

As shown in FIG. 5, the side type LED LCD according to an exemplary embodiment of the present invention includes a lower cover 210, lamp units formed as a plurality of layers on edge portions of both sides of the lower cover and having light emitting units providing light by divisional driving, first and second light guide panels 222 and 224 which are provided as a plurality of layers, the lamp units being fastened to at least one side of the first and second light guide panels 222, 224, divided into a plurality of regions to correspond to the divisionally driven light emitting units, to which light from the light emitting units is partially introduced, and a liquid crystal panel 240 provided at an upper side of the first and second light guide panels 222 and 224.

First, the lower cover 210 made of electrolytic galvanized iron (EGI) or other material may be shaped to configure the lamp units fastened thereto and the first and second light guide panels 222 and 224 in a multi-layer structure.

For example, a rectangular hole may be formed to push the first and second light guide panels 222 and 224 to the sides which extend from a bottom surface of the lower cover 210 and bent at edge regions of four sides, or a protrusion unit may be formed to load the second light guide panel 224 so that the first and second light guide panels 222 and 224 are provided at an inner side of the lower cover 210 at a certain interval.

First metal PCBs 220a and 220b having a plurality of light emitting units, which are divided into a plurality of groups G1 to G4 and divisionally driven, mounted thereon are provided at edge portions of both sides of the lower cover 210. Although not shown, a lamp housing may be provided to fix the first metal PCBs 220a and 220b and protect the light emitting units against an external impact.

A first light guide panel 222 with lamp housings fastened to both sides thereof is mounted between the first metal PCBs 220a and 220b on the lower cover 210. In this case, the first light guide panel 222 includes a plurality of regions operating correspondingly according to the light emitting units mounted on the first metal PCBs 220a and 220b and divisionally driven (or sequentially driven).

Second metal PCBs 223a and 223b, on which a plurality of light emitting units divided into a plurality of groups g1 to g4 so as to be divisionally driven (or sequentially driven) are mounted, and a second light guide panel 224 are provided at an upper side of the first metal PCBs 220a and 220b and the first light guide panel 222 provided on the lower cover 210. In this case, the second light guide panel 224 is divided into a plurality of regions corresponding to the light emitting units mounted on the second metal PCBs 223a and 223b and divisionally driven (or sequentially driven) and operates.

Here, the second metal PCBs 223a and 223b are positioned at both sides of the second light guide panel 224 in a direction perpendicular to the direction in which the first metal PCBs 220a and 220b are positioned. In other words, it means that the respective regions of the first and second light guide panels 222 and 224, which operate correspondingly according to the light emitting units mounted on the first metal PCBs 220a and 220b and the second metal PCBs 223a and 223b and divisionally driven, cross each other.

In addition, the backlight unit according to the present invention may have a multi-layer structure that includes, for example, a first metal PCB to nth metal PCB and a first light guide panel to nth light guide panel. In this case, the odd number metal PCBs and the even number metal PCBs may be alternately positioned, so the odd number metal PCBs or the even number metal PCBs are positioned in the same direction. Here, 'n' is a natural number greater than 1.

A lamp housing is provided to fix the second metal PCBs 223a and 223b at both sides thereof and protects the light emitting units from external impact.

Optical sheets 226 and 228 are mounted at an upper side of the second metal PCBs 220a and 220b and the second light guide panel 222 provided on the lower cover 210. The optical sheets 226 and 228 refer to two diffusion sheets 226 that diffuse light provided from a reflective plate and the first and second light guide panels 222 and 224 to be irradiated onto the liquid crystal panel 240, and two protection sheets 228 that protect the diffusion sheets 226 against any external scratches and other damage.

A panel guide 230, a frame mold product, is fastened at an outer edge of the lower cover 210 in order to maintain the balance of overall power of the LCD and separate the liquid crystal panel 240 by a certain interval.

The liquid crystal panel 240 for receiving image data from an external system and displaying a corresponding image is provided on the panel guide 230. The liquid crystal panel 240 includes a thin film transistor (TFT) array substrate and a color filter substrate that are attached in a facing manner with a uniform cell gap maintained therebetween, and liquid crystal injected between the two substrates.

An upper cover 280 covers the edges of the liquid crystal panel 240 and is assembled and fastened to the panel guide 230.

Figure 6:
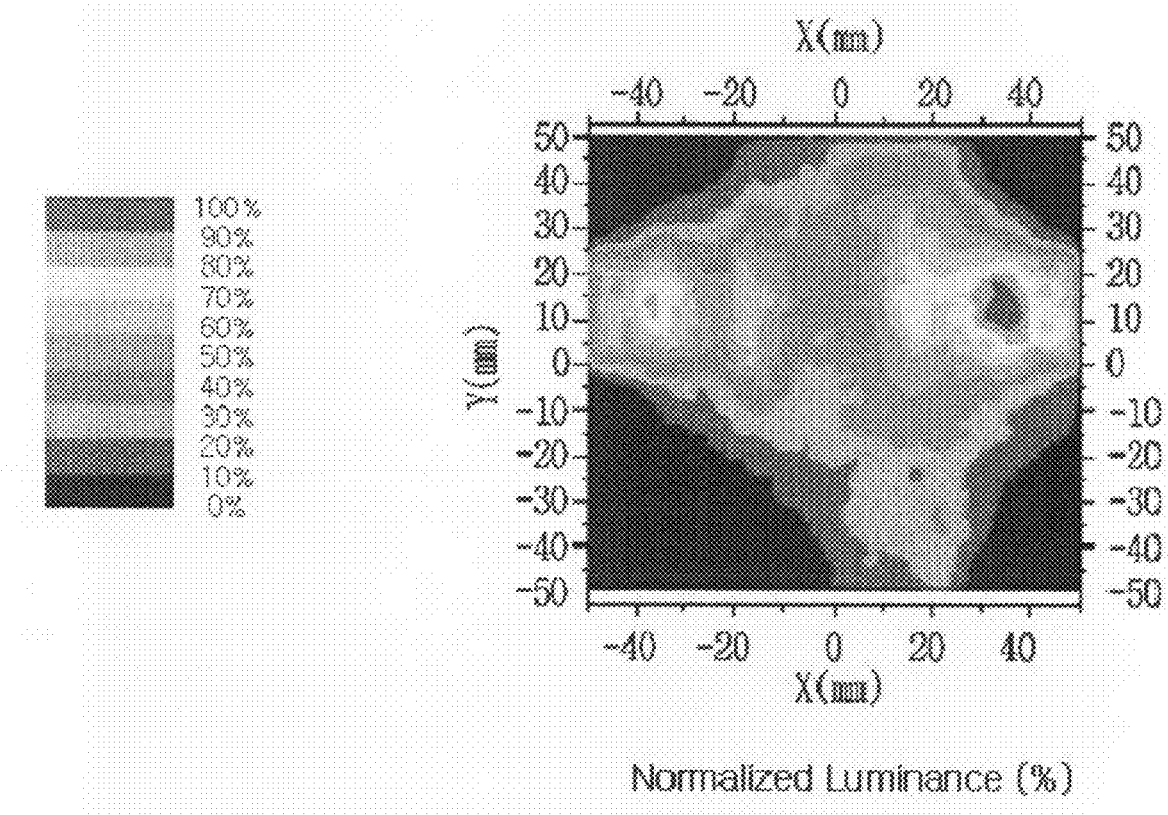
FIG. 6 is a view illustrating a simulation of light propagation state by divisionally driving the LCD in FIG. 5 is scan-driven.

FIG. 6 is a view illustrating simulation of light propagation state by divisionally driving the LCD in FIG. 5 is scan-driven.

For example, if the light emitting units of the second group G2 mounted on the first metal PCBs 220a and 220b and those of the third group g3 mounted on the second metal PCBs 223a and 223b are simultaneously turned on, light would be introduced to the second region of the first light guide panel 222 and the third region of the second light guide panel 224 from the light emitting units of the second and third groups G2 and g3, and accordingly, luminance of a particular region where the lights overlap with each other would be increased compared with other ambient regions.

However, there are options to improve sharpness of picture quality by making light propagate from every corresponding region to other regions.

Figure 7:
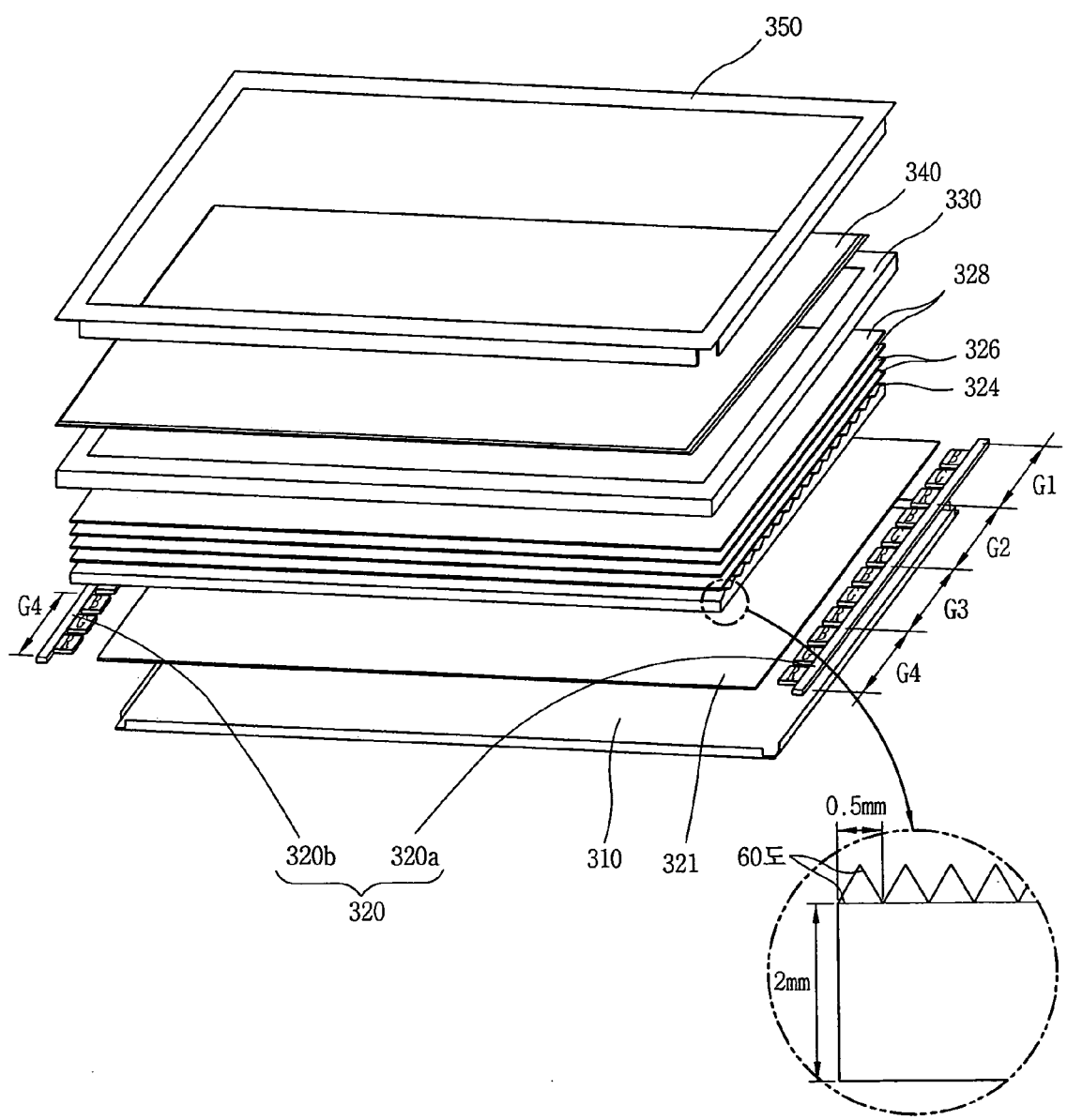
FIG. 7 is an exploded perspective view of the LCD according to a first embodiment of the present invention.

FIG. 7 is an exploded perspective view of the LCD according to a first exemplary embodiment of the present invention.

As shown in FIG. 7, a reflective plate 321 that reflects light emitted from a light emitting element such as an LED onto a liquid crystal panel 340 formed at a front side thereof is attached on a lower cover 310 made of aluminum, EGI, or other material. The reflective plate 321 is formed as a reflective layer by coating metal Ag or Al on a white polyester film. For particular applications, the reflective plate 321 may be formed by hardening an ink with scattering particles of silicon oxide ($SiO_2$) mixed therein in an acrylic solution.

A lamp unit including metal PCBs 320a and 320b on which light emitting units such as the LEDs are mounted and a lamp housing that protects the metal PCBs 320a and 320b against the exterior is provided at edge regions of both sides of the lower cover 310 with the reflective plate 321 attached thereon. In this case, the reflective plate 321 attached on the lower cover 310 may extend to the sides to serve as the lamp housing.

The metal PCBs 320 may be attached on an inner side of a surface extending from a bottom surface and curved upwardly from both edges of the lower cover 310. Here, in order to apply voltages to the LEDs fixed on the PCBs 320, power is applied to portions of positive (+) and negative (−) electrodes formed on the metal PCB 320 via holes formed at corner portions of both sides of the bottom surface of the lower cover 310.

The plurality of light emitting units mounted on the metal PCBs 320 are divided into a plurality of groups G1 to G4, and more accurately, the light emitting units of the respective groups are sequentially driven.

A prism light guide panel 324 with the lamp housing fastened to one side thereof is mounted on the lower cover 310 between the metal PCBs 320a and 320b. In this case, the prism light guide panel 324 is divided into a plurality of regions corresponding to the light emitting units of the plurality of groups G1 to G4 that are mounted on the metal PCBs 320a and 320b and sequentially driven, and operates.

Here, the prism light guide panel 324 has a ratio of the width, the length and the thickness excluding the prism mountains formed on its upper surface is 1:1:0.02. For example, if the width and the length of the prism light guide panel 324 are 200 mm, respectively, the thickness of the prism light guide panel 324 excluding the prism mountains would be 2 mm.

Each prism mountain formed on the upper surface of a main body of the light guide panel with the thickness of 2 mm makes an equilateral triangle with the respective interior angles of 60°, and the length of the base of the equilateral triangle, namely, the pitch of each prism mountain is 0.5 mm. Accordingly, the ratio of the thickness of the light guide panel excluding the prism mountains and the pitch of the prism mountains is about 1:0.25.

The ridges of the prism mountains may be formed by extending along in a longer-axis direction from the upper surface of the prism light guide panel 324 and the valleys formed between the prism mountains are positioned toward the metal PCBs 320 at both sides thereof.

As for the prism light guide panel 324 with the prism mountains formed thereon, when the light emitting units of the first group G1 are turned on, light emitted from the light emitting units is introduced to a first region of the prism light guide panel 324 and the introduced light is reflected to the interior of the first region via the prism mountains positioned on the prism light guide panel 324 of the first region, thereby proceeding to the front surface without light propagation to a second region. In addition, when the light emitting units of the first group G1 are turned off and, at the same time, light emitting units of the second group G2 are turned on, light is introduced to the second region of the prism light guide panel 324 and the introduced light is reflected to the interior of the second region via the prism mountains formed on the prism light guide panel 324 of the second region, thereby performing scanning driving without light propagation to the first region or to a third region. Consequently, when operated as described, because light introduced to the prism light guide panel 324 correspondingly according to the light emitting units that are sequentially driven in the respective groups G1 to G4 is reflected at the interior of a corresponding region via the prism mountains, light is provided to a corresponding region of the liquid crystal panel 340 without substantial light propagation to other regions.

The prism light guide panel 324 is fabricated in a planar shape using plastic or a resin such as PMMA (Polymethylmethacrylate), and the prism pattern on its upper surfaces may be formed through injection molding using a stamp. A diffusion pattern may be formed on a lower surface of the prism light guide panel 324, for which a light scattering ink pattern may be used as a screen printing.

Optical sheets 326 and 328 are mounted at an upper side of the metal PCBs 320 and the light guide panel 324 provided on the lower cover 310. The optical sheets 326 and 328 refer to two diffusion sheets 326 that diffuse light provided from the reflective plate 321 and the light guide panel 324 to illuminate the liquid crystal panel 340, and two protection sheets 328 that protect the diffusion sheets 326 against any external scratches, and other damage.

A panel guide 330, a frame mold product, is fastened at an outer edge of the lower cover 310 in order to maintain the balance of overall power of the LCD and to maintain a certain interval from the liquid crystal panel 340.

The liquid crystal panel 340 for receiving image data from an external system and displaying a corresponding image is provided on the panel guide 330. The liquid crystal panel 340 includes a thin film transistor (TFT) array substrate and a color filter substrate attached to face each other with a uniform cell gap maintained therebetween. Liquid crystal is injected or otherwise disposed between the two substrates.

An upper cover 350 covers the edges of the liquid crystal panel 240 and is assembled and fastened to the panel guide 230.

Figure 8:
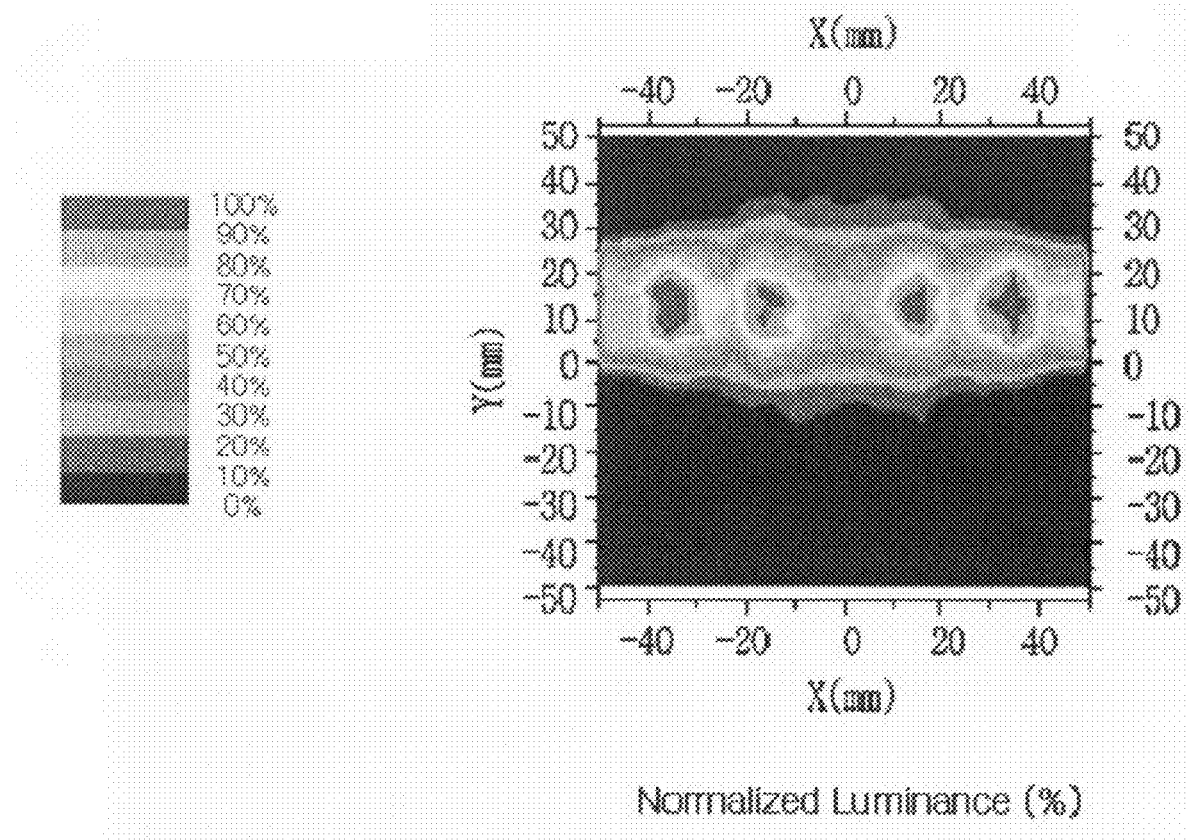
FIG. 8 is a view illustrating a simulation of light propagation state by divisionally driving the LCD in FIG. 7 is scan-driven.

FIG. 8 shows a simulation of light propagation state by divisionally driving the LCD in FIG. 7 is scan-driven.

As described above with reference to FIG. 7, it is noted that when light emitting units of the second group G2 are turned on, light radiated from the light emitting units is introduced along the second region of the prism light guide panel and reflected to the interior of the second region via the prism mountains formed on the prism light guide panel, thus light diffusion to other regions can be reduced or eliminated.

Figure 1:
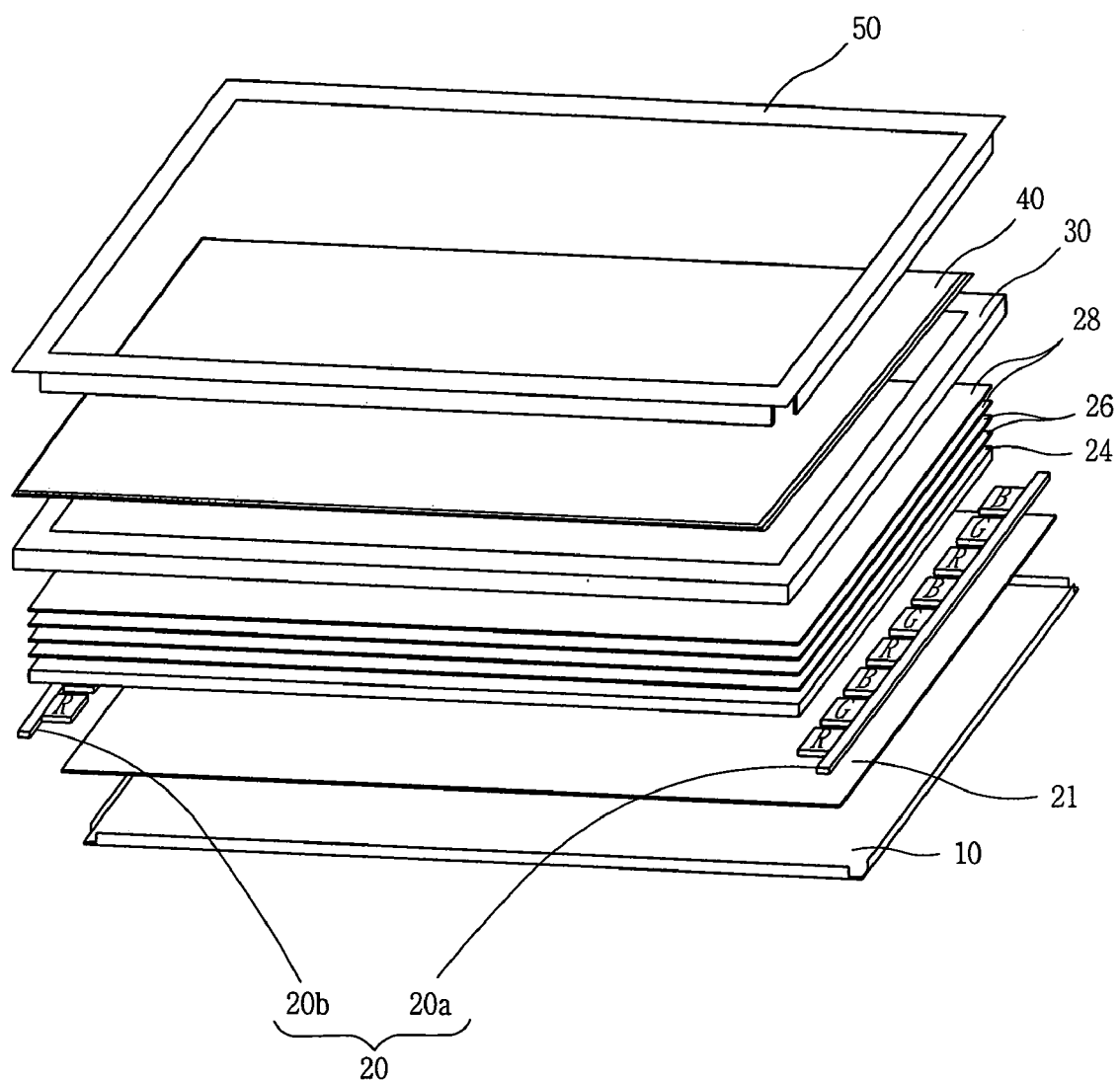
FIG. 1 is an exploded perspective view of a general side type light emitting diode (LED) liquid crystal display (LCD) in which LEDs, a light source, are disposed at the side portions of a light guide panel.
Figure 2:
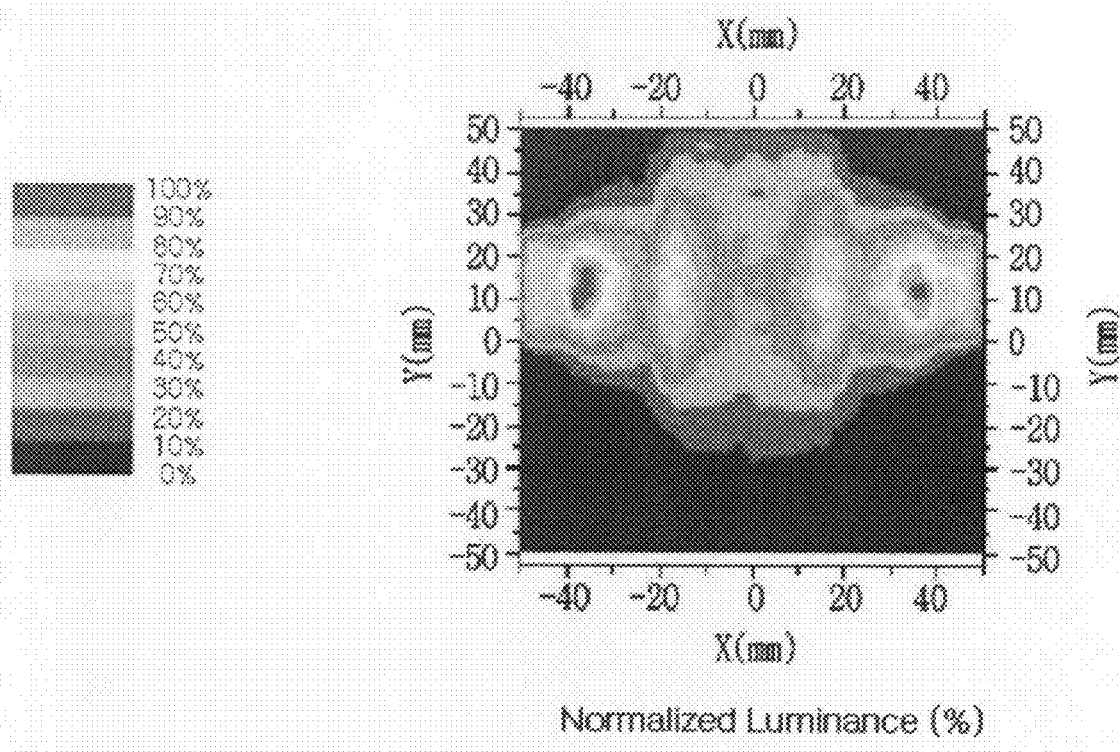
FIG. 2 is a view illustrating a simulation of the light propagation state when the LCD is scan-driven.
Figure 3:
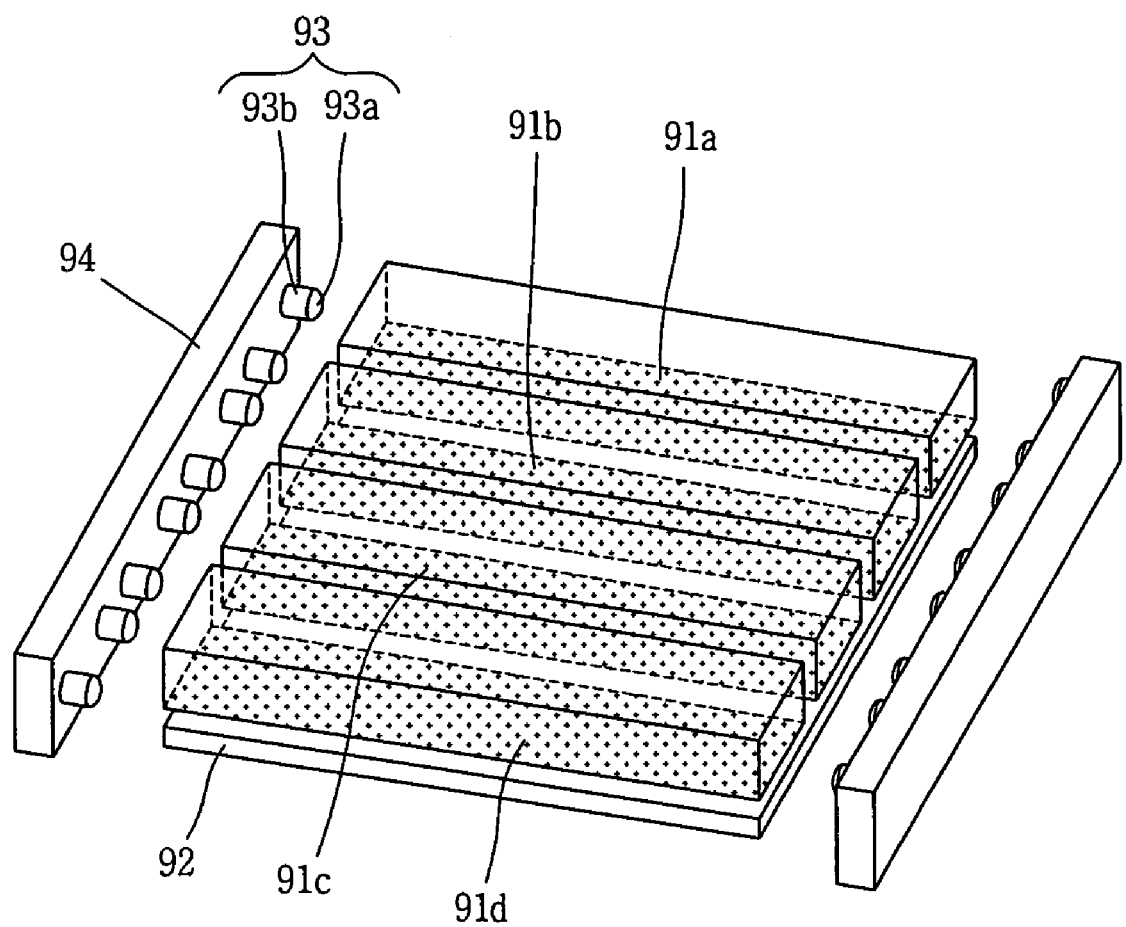
FIG. 3 is an exploded perspective view showing a backlight structure of a side type LED LCD having a divisional light guide panel according to the related art.
Figure 4:
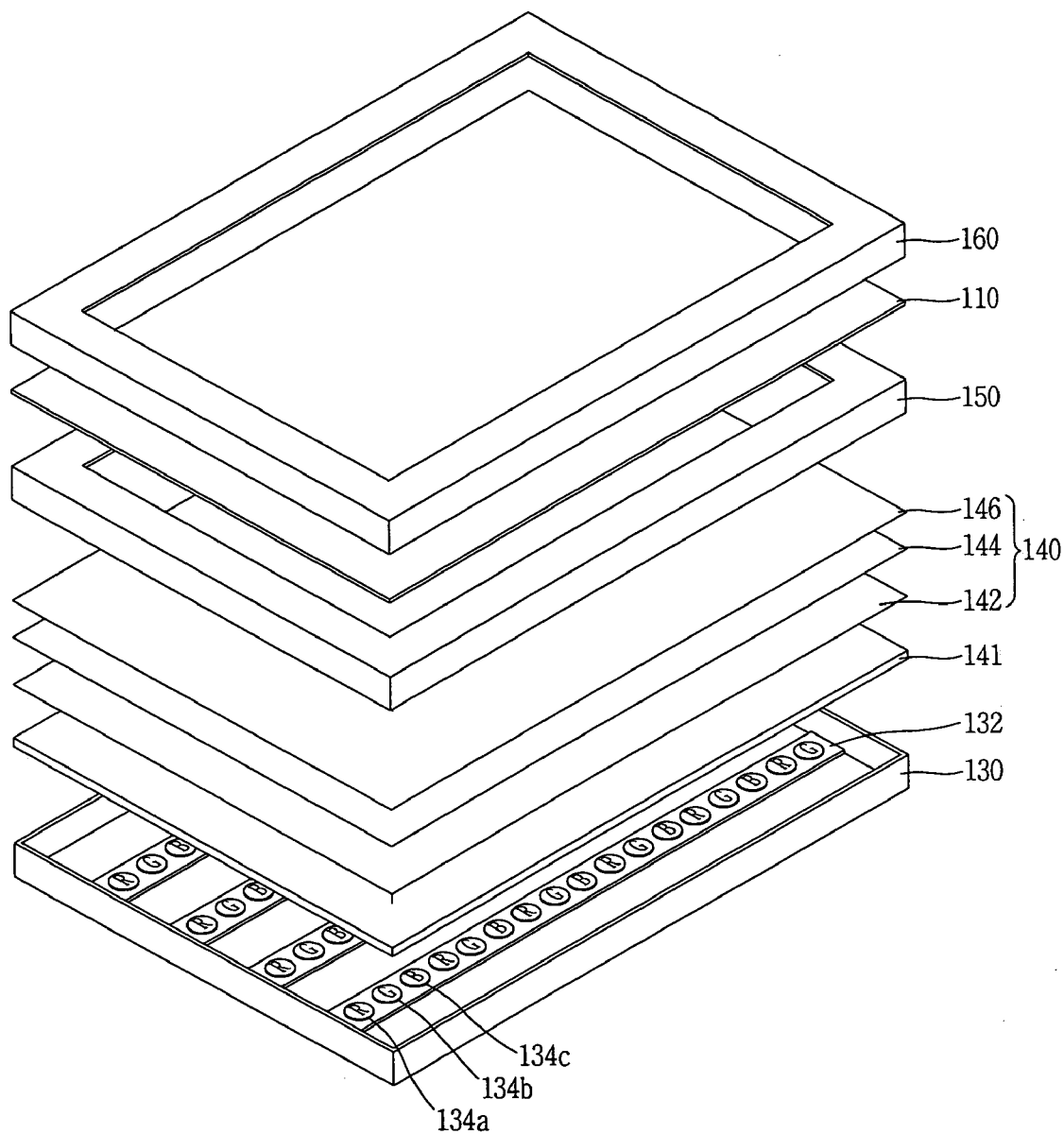
FIG. 4 is an exploded perspective view showing a direct type LED LCD of the related art.

By comparison with FIG. 2 showing light propagation in a related art LCD, it can be noted that light propagation from regions of each group to other regions of different groups is comparitively small.

The results obtained may be varied by adjusting the interior angles of the prism mountains formed on the prism light guide panel to affect the internal reflection of light. Thus, an optimum design is required for each particular application.

The present invention can be also applied to an edge type LED LCD to allow divisional driving to be performed to enhance the sharpness of overall picture quality according another embodiment of the present invention.

Figure 9:
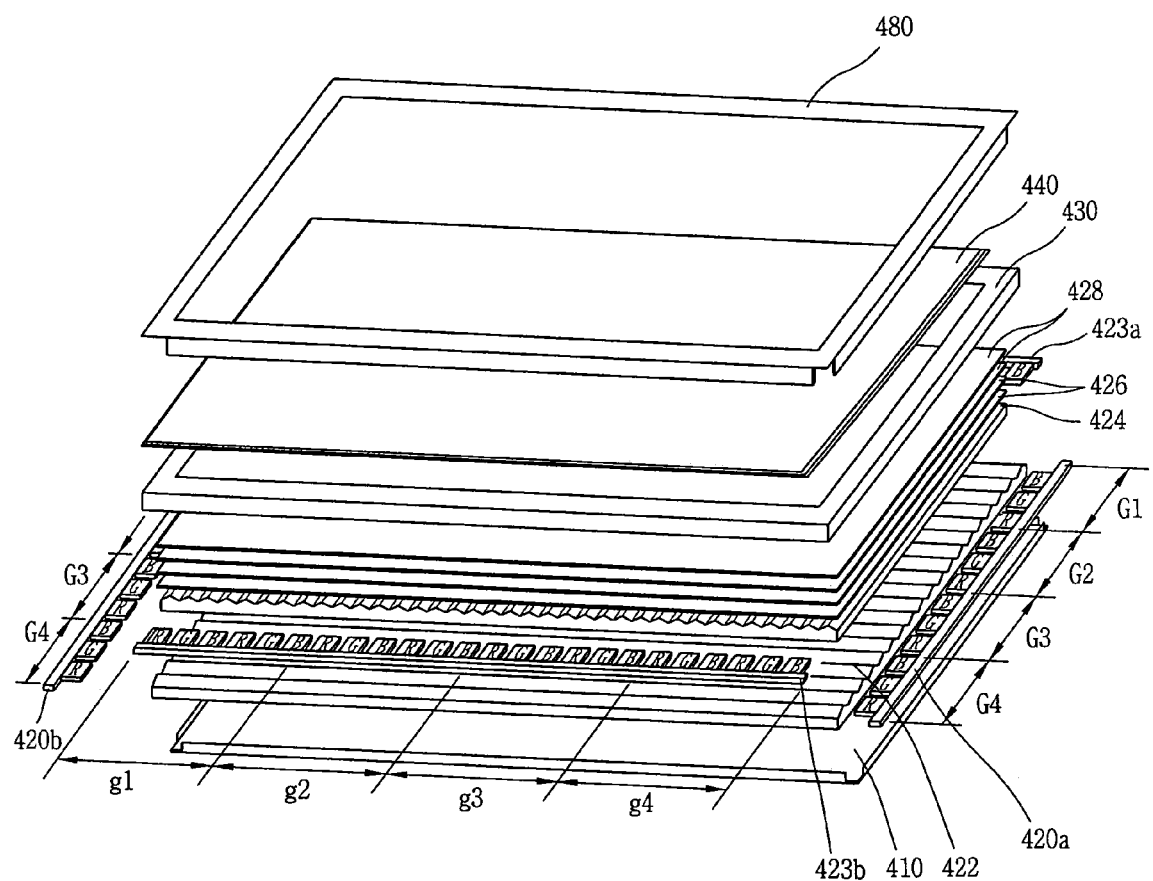
FIG. 9 is an exploded perspective view of the LCD according to a second embodiment of the present invention.

FIG. 9 is an exploded perspective view of the LCD according to a second exemplary embodiment of the present invention.

As shown in FIG. 9, an LCD according to the second exemplary embodiment of the present invention includes lamp units formed as a plurality of layers at edge regions of both sides of a lower cover 410 and providing light by means of light emitting units that are divisionally driven, first and second prism light guide panels 422 and 424 to which the lamp units are fastened to at least one side thereof and to which light from the light emitting units that are divisionally driven is partially introduced, and a liquid crystal panel provided at an upper side of the second prism light guide panel 424 and provided with light.

The lower cover 410, made of EGI or other material, is shaped to configure the lamp units fastened thereto and the first and second light guide panels 222 and 224 in a multi-layer structure.

For example, a rectangular hole may be formed to push the first and second prism light guide panels 422 and 424 to the sides which extend from a bottom surface of the lower cover 410 and bent at edge regions of four sides. Alternatively, a protrusion unit may be formed to load the second prism light guide panel 424 so as for the plurality of first and second prism light guide panels 422 and 424 to be provided at an inner side of the lower cover 410 at a certain interval.

First metal PCBs 420a and 420b having a plurality of light emitting units, which are divided into a plurality of groups G1 to G4 and divisionally driven, mounted thereon are provided at edge portions of both sides of the lower cover 410. Although not shown, a lamp housing may be provided to fix the first metal PCBs 420a and 420b and protect the light emitting units against an external impact.

A first prism light guide panel 422 with lamp housings fastened to both sides thereof is mounted between the first metal PCBs 420a and 420b on the lower cover 410. In this case, the first prism light guide panel 422 is divided into a plurality of regions to operate with corresponding light emitting units that are mounted on the first metal PCBs 420a and 420b and divisionally driven (or sequentially driven) by groups G1 to G4.

The ridges of the prism mountains may be formed by extending along in a longer-axis direction on the first prism light guide panel 422 and the valleys formed between the prism mountains are positioned toward the light emitting units mounted on the first metal PCBs 420a and 420b formed at both sides thereof.

Second metal PCBs 423a and 423b, on which a plurality of light emitting units divided into a plurality of groups g1 to g4 so as to be divisionally driven (or sequentially driven) are mounted, and the second prism light guide panel 424 are provided on the first metal PCBs 420a and 420b and the first prism light guide panel 422 provided on the lower cover 410. In this case, the second prism light guide panel 424 is divided into a plurality of regions so as to operate correspondingly according to light emitting units that are mounted on the second metal PCBs 423a and 423b provided at an upper side of the first metal PCBs 420a and 420b and divisionally driven (or sequentially driven) by groups g1 to g4.

Of course, the ridges of the prism mountains may be formed by extending along in a longer-axis direction on the second prism light guide panel 424 and the valleys formed between the prism mountains are positioned toward the light emitting units mounted on the second metal PCBs 423a and 423b formed at both sides thereof.

Both ridges of the prism mountains on the second prism light guide panel 424 and those on the first prism light guide panel 422 positioned at a lower side of the second prism light guide panel 424 are perpendicular to each other.

Here, the second metal PCBs 423a and 423b are positioned at both sides of the second prism light guide panel 424 in a direction perpendicular to the direction in which the first metal PCBs 420a and 420b are positioned. In other words, it means that the respective regions of the first and second light guide panels 422 and 424, which operate correspondingly according to the light emitting units mounted on the first metal PCBs 420a and 420b and the second metal PCBs 423a and 423b and divisionally driven, cross each other.

The backlight unit according to the present invention may have a multi-layer structure that includes, for example, a first metal PCB to the nth metal PCB and a first prism light guide panel to the nth prism light guide panel. In this case, the odd number metal PCBs and the even number metal PCBs may be alternately positioned, so the odd number metal PCBs or the even number metal PCBs are positioned in the same direction. Here, 'n' is a natural number greater than 1.

Although not shown, a lamp housing may be provided to fix the second metal PCBs 423a and 423b at both sides thereof and protect the light emitting units from external impact.

Optical sheets 426 and 428 are mounted at an upper side of the second metal PCBs 420a and 420b and the second light guide panel 422 attached on the lower cover 410. The optical sheets 426 and 428 refer to two diffusion sheets 426 that improves efficiency of light provided from a reflective plate and the first and second prism light guide panels 422 and 424 so as to be irradiated onto the liquid crystal panel 440, and two protection sheets 428 that protect the diffusion sheets 426 against any external scratches, etc.

In the edge type LED backlight unit according to the third exemplary embodiment of the present invention, the light emitting units mounted on the first metal PCBs 420a and 420b are divisionally driven (or sequentially driven) by the groups G1 to G4. In this case, light is introduced to a corresponding region of the first prism light guide panel 422 with the prism mountains thereon correspondingly according to light emitting units divisionally driven by group at both sides thereof, and the introduced light is reflected to the interior of the corresponding region via the prism mountains and proceeds with the front surface without light propagation to other regions.

The light emitting units on the second metal PCBs 423a and 423b provided at an upper side of the first metal PCBs 420a and 420b are also divisionally driven by groups g1 to g4. In this case, light is introduced to a corresponding region of the second prism light guide panel 424 correspondingly according to the light emitting units that are divisionally driven by groups at both sides thereof, and the introduced light is reflected to the interior of the corresponding region via the prism mountains formed thereon and proceeds with the front surface without light propagation to other regions.

In this case, for example, if the light emitting units of the second group G2 mounted on the first metal PCBs 420a and 420b and those of the third group G3 mounted on the second metal PCBs 423a and 423b are simultaneously turned on, light would be introduced to the second region of the first prism light guide panel 422 and to the third region of the second prism light guide panel 424 from the light emitting units of the second and third groups G2 and G3, and accordingly, luminance of a particular region where the lights overlap with each other would be increased compared with other ambient regions.

In this manner, when an image is displayed on the liquid crystal panel 440, the image of the particular region could have an increased contrast ratio compared with other ambient regions so that sharpness of the picture quality can be increased. This is because the divisional driving can be possible, namely, because the particular region of the backlight can be partially driven.

Figure 10:
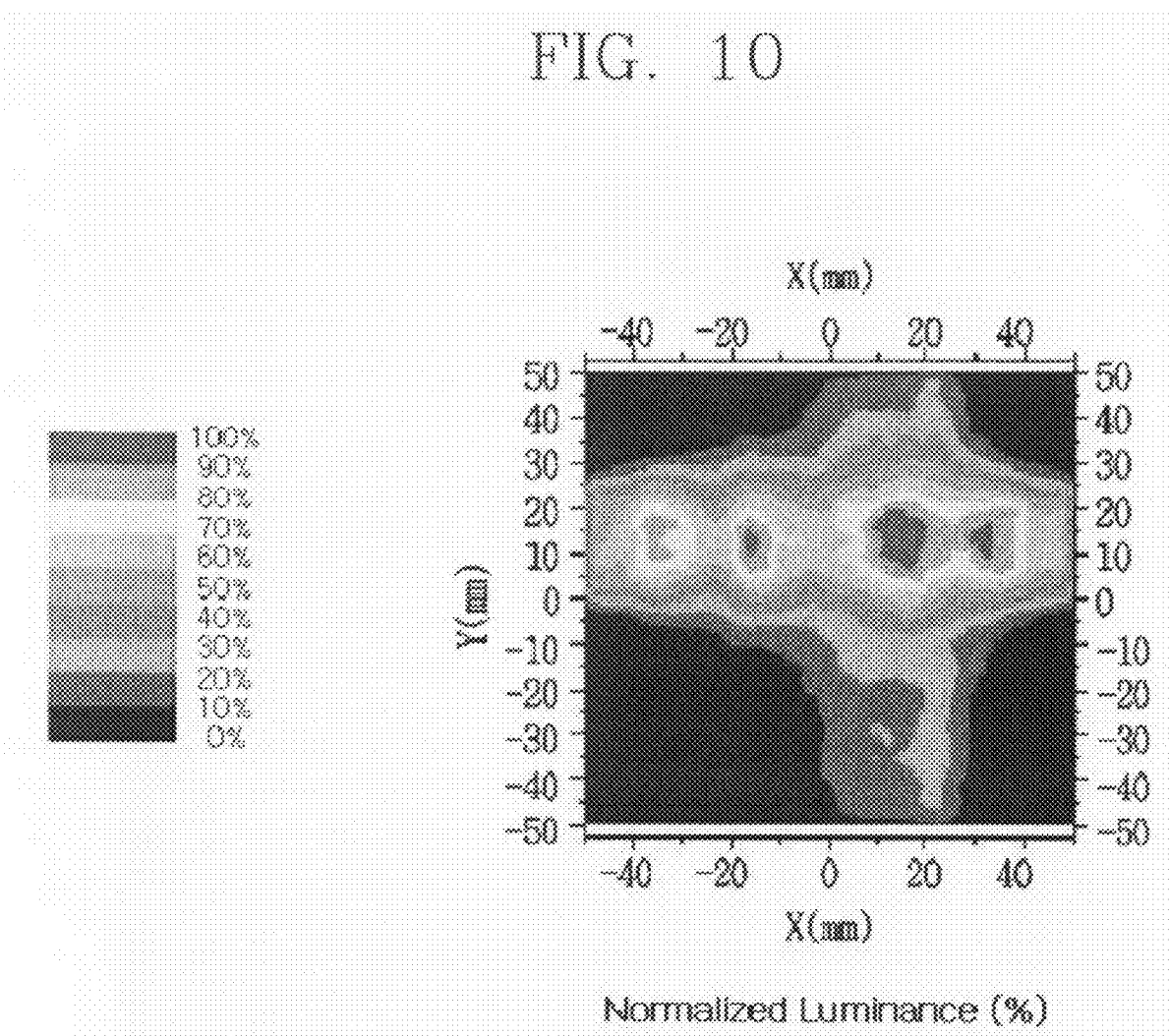
FIG. 10 is a view illustrating a simulation of light propagation state by divisionally driving the LCD in FIG. 9 is scan-driven.

FIG. 10 is a view illustrating simulation of light propagation state by divisionally driving the LCD in FIG. 9 is scan-driven.

As described above, it is noted that when light is introduced to the particular region of the first prism light guide panel 422 and the second prism light guide panel 424, the luminance of the region where the lights overlap with each other is increased compared with other ambient regions.

Such results may be determined by making light reflected to be different at the interior of the corresponding region by adjusting the interior angles of the prism mountains formed on the prism light guide panel. Thus, in order to obtain better effect than that of the simulation results of FIG. 10, an optimum designing is required.

Figure 11:
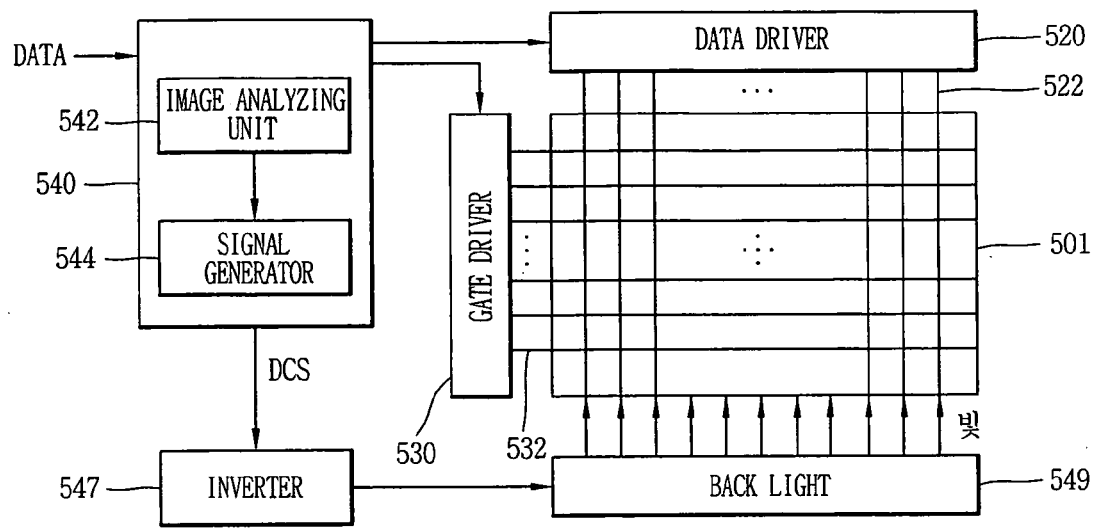
FIG. 11 is a block diagram of the LCD in shown FIG. 9.

FIG. 11 is a block diagram of the LCD shown in FIG. 9.

As shown in FIG. 11, a liquid crystal panel 501 is fabricated such that first and second substrates are attached to face each other with a certain cell gap maintained therebetween, and with a liquid crystal layer formed by filling liquid crystal in the cell gap. A plurality of data lines 522 are arranged in a vertical direction and a plurality of gate lines 532 are arranged in a horizontal direction on the first substrate. The data lines 522 and the gate lines 532 cross each other to define a plurality of pixel areas. The plurality of pixels is electrically connected to the gate lines 532 and the data lines 522.

A data driver 520 is electrically connected with the liquid crystal panel 501 via the data lines 522, and a gate driver 530 is electrically connected with the liquid crystal panel 501 via the gate lines 532.

When data (DATA) is supplied from an external source such as a graphic card, a timing controller 540 generates various control signals for driving the LCD by using the data (DATA) and applies a control signal and an image signal to the data driver 520 and control signals to the gate driver 530.

The timing controller 540 includes an image analyzing unit 542 and a signal generator 544 to analyze image information of the data (DATA) provided from the external source to determine a dimming duty, to generate a control signal for divisionally driving a backlight 549 according to the dimming duty, and to provides the control signal to an inverter 547.

Here, in general, the inverter substantially controls a supply time duration of a tubular current by switching on or off a switch within a maximum period time during which the tubular current can be supplied to the light emitting units of the backlight. The dimming duty refers to a value of the actual tubular current supply time duration with respect to the period time during which the tubular current can be supplied by the inverter to the light emitting units in each frame.

In general, the data (DATA) supplied from the graphic card, or other external system, includes image information, a control signal, and a driving voltage. Here, the image information includes a luminance signal and a chrominance signal, and by detecting and analyzing the luminance signal, a luminance distribution of a screen image can be known.

The image analyzing unit 542 primarily analyzes the luminance signal detected from the image information, calculates an average luminance of the image, and determines a first dimming duty according to the calculated average luminance.

The image analyzing unit 542 secondarily analyzes the luminance signal to determine luminance of each region of the image, individually adds a dimming duty according to the luminance of each region, and finally determines a second dimming duty.

The signal generator 544 outputs a dimming control signal DCS to the inverter 547 according to the second dimming duty determined by the image analyzing unit 542.

The inverter 547 drives the light emitting units formed as multiple layers in the backlight 549 by groups according to the dimming control signal DCS applied from the timing controller 540, so that a different amount of light can be emitted to correspond to images of each region.

Figure 12:
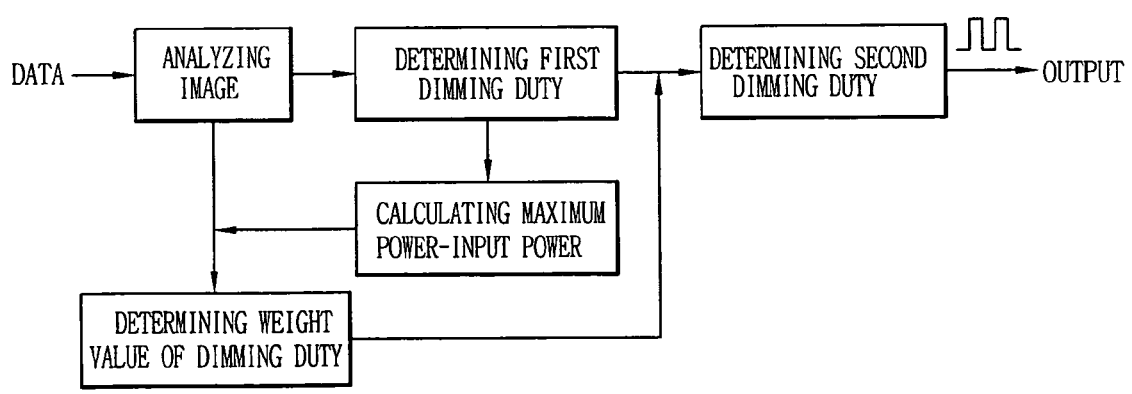
FIG. 12 is a sub-block diagram of a timing controller shown in FIG. 11.

FIG. 12 is a sub-block diagram of the timing controller 540 in FIG. 11.

As shown FIG. 12, the image analyzing unit 542 performs primary and secondary image analyzing to analyze the image information of the data. Here, the primary image analyzing is performed to obtain an average luminance from an image of a single frame unit by detecting luminance of the image information. Through the primary image analyzing, input power to be supplied to the entire image is determined. The input power supplied to drive the light emitting units is limited to be lower than a maximum power level in order to reduce undesirable power consumption in a screen image of a high luminance.

When the input power to be supplied to the light emitting units is determined through the primary image analyzing, a first dimming duty of a tubular current for supplying the input power to the light emitting units is determined. The inverter that controls driving of the light emitting units can control the input power by controlling a supply time duration of the tubular current supplied to the light emitting units.

After the first dimming duty is determined, the luminance of each region of the image is analyzed through the secondary image analyzing. Namely, a luminance distribution of each region of the image to be displayed on a screen, which may differ from the average luminance of the entire image determined in the primary image analyzing, is analyzed.

When the luminance distribution of each region of the image is analyzed, the same luminance may appear as a pattern with a certain area. The luminance of the pattern may be decreased or increased to emphasize the image. That is, the secondary image analyzing is performed to emphasize the image by regions.

In the second image analyzing, the luminance distribution of each region of the image is analyzed as described above, the remaining available power above the input power determined for exhibiting the average luminance of the image in the primary image analyzing, is suitably distributed to each region. The remaining available power can be obtained by subtracting the input power determined in the primary image analyzing process from maximum power and, the remaining available power is distributed to drive light emitting units corresponding to a region for which luminance is to be emphasized in the image.

After a dimming duty weight value of each region is determined by the remaining available power, a second dimming duty is finally determined for being added to the first dimming duty. The second dimming duty is information for substantially driving the plurality of light emitting units.

Figure 13:
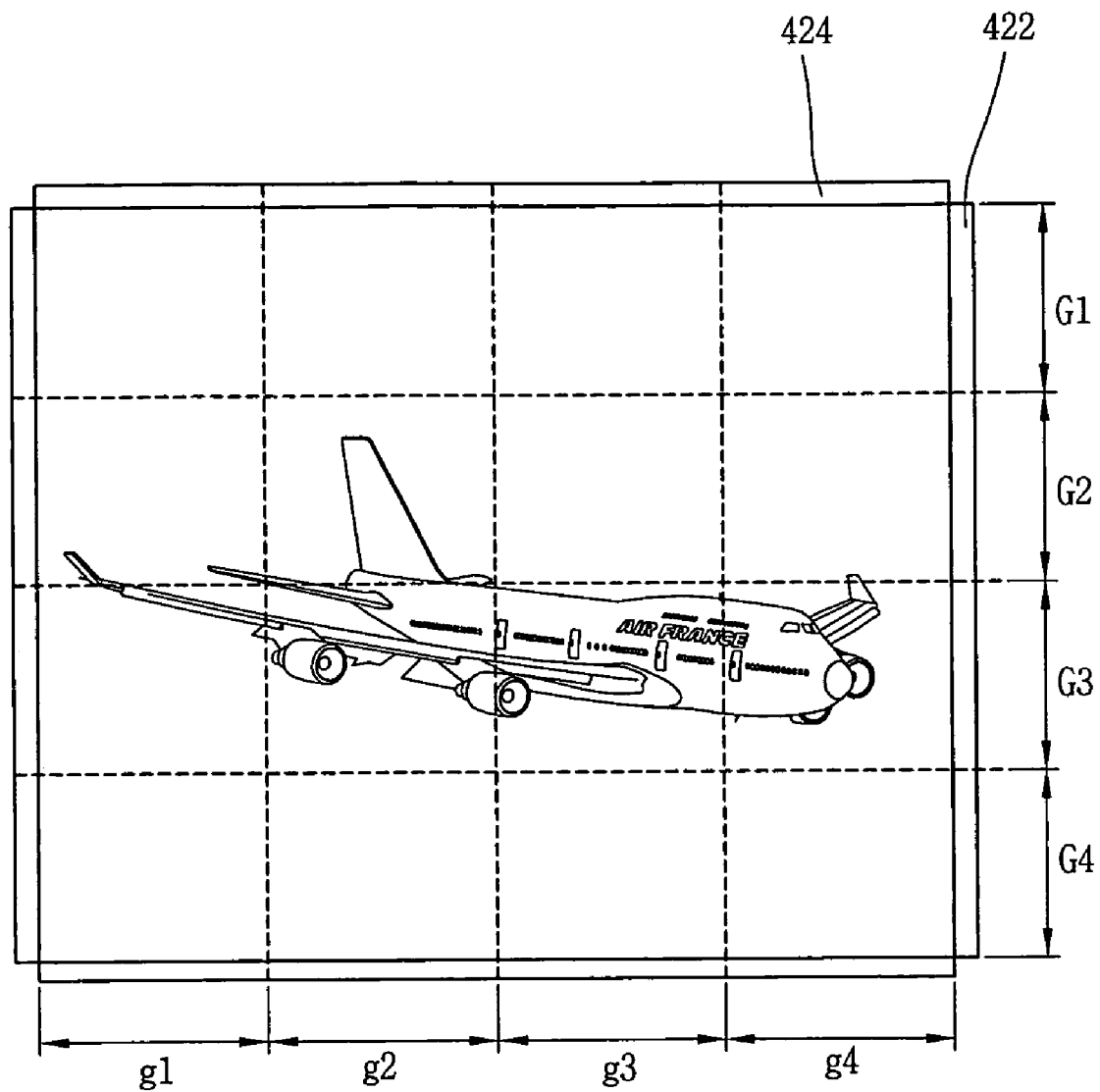
FIG. 13 is a view showing a backlight control state according to the driving method in FIG. 9 when the LCD displays an image.

FIG. 13 is a view showing a backlight control state according to the driving method in FIG. 9 when the LCD displays an image.

As shown in FIG. 13, the backlight according to the present invention includes the first prism light guide panel 422 provided at a lower side and divisionally driven by a plurality of regions, and the second prism light guide panel 424 separately provided at an upper side of the first prism light guide panel 422 and divisionally driven by a plurality of regions. Although not shown, the liquid crystal panel for substantially displaying an image is positioned at an upper side of the backlight.

Here, if such an image as shown in FIG. 13 is displayed on the liquid crystal panel, the first prism light guide panel 422 may assign a weight value to the light emitting units of the second group G2 and the third group G3 fastened to at least one side thereof to increase the dimming duty, so that the luminance of the second region corresponding to the light emitting units of the second group G2 and the third region corresponding to the light emitting units of the third group G3 can be increased.

In this case, the second prism light guide panel 424 may maintain the same dimming duty at the light emitting units of the first to fourth groups g1 to g4 fastened to at least one side thereof to provide light of the overall average luminance As a result, the light provided to the liquid crystal panel by the first and second prism light guide panels 422 and 424 may allow some regions of the image displayed on the liquid crystal panel to have higher luminance compared with other regions, thus increasing the sharpness of the image overall on the screen.

The above-described method is merely an example method of operation in accordance with the invention. The light emitting units fastened to at least one side of the first and second prism light guide panels 422 and 424 can be divisionally driven by properly assigning a weight value thereto according to an image analysis substantially provided from an external system, to thus further increase the sharpness of the screen image overall.

In addition, there may be various access methods with respect to the control method for controlling the backlight of the side type LED LCD by performing scanning and divisional driving. For example, the scanning and divisional driving can be performed in the backlight according to coordinate analysis of an image, without being limited thereto.

In the side type LED LCD according to the present invention, because all of the light emitting units provided on at least one side of the prism light guide panels and divisionally driven by groups can be simultaneously turned on, as well as performing scanning and divisional driving, white light of the uniform luminance in the overall backlight can be provided to the liquid crystal panel.

As the present invention may be embodied in several forms without departing from the spirit thereof, it should also be understood that the above-described embodiments are not limited by any of the details of the foregoing description, unless otherwise specified, but rather should be construed broadly within its spirit and scope as defined in the appended claims. Thus, it is intended that the present invention cover the modifications and variations of this invention provided they come within the scope of the appended claims and their equivalents.

What is claimed is:

1. A liquid crystal display device comprising:
    a lower cover;
    first and second prism light guide panels disposed in a plurality of layers on the lower cover, ridges of prism mountains formed on the first prism light guide panel being substantially perpendicular to ridges of prism mountains formed on the second prism light guide panel;
    lamp units being provided on at least one side of each prism light guide panel along the ridges of the prism mountains; and
    a liquid crystal panel separated from the prism light guide panels that receives light transmitted through the first and second light guide panels emitted from the lamp units,
    wherein the ridges of prism mountains are formed on the upper surface of the first and second prism light guide panels so that the light output from the prism light guide panels are focused by the corresponding ridge of prism mountains.

2. The device of claim 1, wherein the interior angles of each of the prism mountains are 60.degree.

3. The device of claim 1, wherein each lamp unit comprises:
    a light emitting unit that emit light;
    a PCB to which the light emitting unit is fixed; and
    a lamp housing that covers the PCB.

4. The device of claim 3, wherein the lamp housing is formed by extending a reflective plate attached on the lower cover.

5. A liquid crystal display device comprising:
    a lower cover;
    lamps being provided at edges of the lower cover, the lamps dividing a plurality of groups to be driven in time sequentially;
    a prism light guide panel divided into a plurality of driving regions corresponding to a plurality of groups of the lamps so that the light is sequentially inputted to a plurality of the dividing region of the prism light guide panel;
    a plurality of prism mountains formed on the upper surface of the prism light guide panel, the prism mountains being extendedly formed in the same direction as a direction in which light proceeds by having the lamps at least one side thereof so that light from the lamps of one group reflects to the inside of the corresponding dividing region of the prism light guide panel in order to prevent propagation of the light to other dividing regions the prism light guide panel from the corresponding dividing region of the prism light guide panel when the lamps of each group are driven; and
    a liquid crystal panel separated from the prism light guide panel and provided with light.

6. The device of claim 5, wherein when the prism light guide panel is formed as a plurality of layers, the ridges of the prism mountains formed on one prism light guide panel is perpendicular to those of the prism mountains formed on another light guide panel.

7. The device of claim 5, wherein the interior angles of each of the prism mountains are 60.degree.

8. A liquid crystal display device comprising:
    a lower cover;
    a plurality of lamps being provided to form a plurality of layers at edges of the lower, the lamps of each layer dividing a plurality of groups to be driven in time sequentially;
    a prism light guide panel having a plurality of layers, each layer of prism light guide panel including prism mountains extendedly formed in the same direction as a direction in which the light proceeds by fastening the lamps to at least one side thereof, each layer of prism light guide panel being divided into a plurality of driving regions corresponding to a plurality of groups of the lamps in the corresponding layer;

a plurality of prism mountains formed on the upper surface of each layer of the prism light guide panel, the prism mountains being extendedly formed in the same direction as a direction in which light proceeds by having the lamps at least one side thereof; and a liquid crystal panel separated from the prism light guide panel and provided with light, wherein a plurality of the lamps are time-sequentially driven so that the lights from the groups of different layers of the lamps are overlapped to increase brightness of at the corresponding region.

9. The device of claim 8, wherein the ridges of the prism mountains formed on one layer of the prism light guide panel is perpendicular to those of the prism mountains formed on another layer of the light guide panel.

10. The device of claim 8, wherein each of the interior angles of the prism mountains are 60.degree.

* * * * *